United States Patent
Abbasian Chaleshtari et al.

(10) Patent No.: US 11,447,401 B1
(45) Date of Patent: Sep. 20, 2022

(54) SEPARATION COLUMNS FOR PER- AND POLYFLUOROALKYL SUBSTANCES (PFAS) REMEDIATION

(71) Applicant: Arrowhead Center, Inc., Las Cruces, NM (US)

(72) Inventors: Zahra Abbasian Chaleshtari, Las Cruces, NM (US); Reza Foudazi, Norman, OK (US)

(73) Assignee: Arrowhead Center, Inc., Las Cruces, NM (US)

( * ) Notice: Subject to any disclaimer, the term of this patent is extended or adjusted under 35 U.S.C. 154(b) by 133 days.

(21) Appl. No.: 16/868,336

(22) Filed: May 6, 2020

Related U.S. Application Data (60) Provisional application No. 62/843,914, filed on May 6, 2019.

(51) Int. Cl.
*C02F 1/24* (2006.01)
*B03D 1/14* (2006.01)
(Continued)

(52) U.S. Cl.
CPC .............. *C02F 1/24* (2013.01); *B03D 1/14* (2013.01); *C02F 1/74* (2013.01); *B03D 2201/04* (2013.01);
(Continued)

(58) Field of Classification Search
CPC ........ B03D 1/082; B03D 1/02; B03D 1/1406; B03D 1/1481; B03D 1/028; B03D 1/1475; B03D 1/245; B01D 47/021; C02F 1/24
(Continued)

(56) References Cited

U.S. PATENT DOCUMENTS

| 4,203,837 A | 5/1980 | Hoge et al. | |
| 6,375,921 B1 * | 4/2002 | Eickhoff | B01J 8/22 422/607 |

(Continued)

FOREIGN PATENT DOCUMENTS

| CN | 101070204 | 11/2007 |
| CN | 104324587 | 2/2015 |

(Continued)

OTHER PUBLICATIONS

Alkhalidi, Ammar A., et al., "Factor Affecting Bubble Creation and Bubble Size", Proceedings of the ASME 2011 International Mechanical Engineering Congress & Exposition, Denver, Colorado, Nov. 11, 2011.

(Continued)

*Primary Examiner* — Claire A Norris
(74) *Attorney, Agent, or Firm* — Peacock Law P.C.; Philip D. Askenazy (57) ABSTRACT

Separation columns and methods for PFAS removal from water resources. Each column comprises perforated trays, level-controlled gates and air spargers placed on the top of each tray. Air bubbles of optimum size injected on the surface of each tray rise to the top of each tray, separating PFAS, thus creating a PFAS-enriched foam at the top. The amount of air or other gas injected at each stage of the column is optimally determined to increase the gas-water contact time and decrease enriched foam production. The foam is collected from the surface and undergoes a simple low-pressure evaporation process to break the bubbles. Multi-stage air injection using a sparger or distributer to inject air or other gas bubbles in each tray produces higher turbulence on each tray and more fresh and small bubbles of controlled size along the column height, thus enhancing contaminant removal and reducing operating costs.

28 Claims, 4 Drawing Sheets

(51) Int. Cl.
 *C02F 1/74* (2006.01)
 *C02F 103/06* (2006.01)
 *C02F 101/36* (2006.01)
(52) U.S. Cl.
 CPC .... B03D 2203/008 (2013.01); *C02F 2101/36* (2013.01); *C02F 2103/06* (2013.01)
(58) Field of Classification Search
 USPC .................................. 210/221.1, 221.2, 703
 See application file for complete search history.

(56) References Cited

U.S. PATENT DOCUMENTS

| | | |
|---|---|---|
| 2009/0152193 A1 | 6/2009 | Yamasaki et al. |
| 2009/0250396 A1 | 10/2009 | Yamasaki et al. |
| 2014/0190896 A1 | 7/2014 | Dickson |
| 2014/0246366 A1 | 9/2014 | Kerfoot |
| 2019/0210900 A1 | 7/2019 | Ball et al. |
| 2019/0263679 A1 | 8/2019 | Phillips et al. |
| 2019/0300387 A1 | 10/2019 | Nelson |

FOREIGN PATENT DOCUMENTS

| | | |
|---|---|---|
| CN | 107935236 | 4/2018 |
| CN | 207493515 | 6/2018 |
| JP | 2007326017 | 12/2007 |
| JP | 2009255011 | 11/2009 |
| JP | 2009255015 | 11/2009 |
| JP | 2010022960 | 2/2010 |

OTHER PUBLICATIONS

Boo, Chanhee, et al., "High Performance Nanofiltration Membrane for Effective Removal of Perfluoroalkyl Substances at High Water Recovery", Environmental Science & Technology, vol. 52, American Chemical Society, 2018, 7279-7288.

Ebersbach, Ina, et al., "An alternative treatement method for fluorosurfactant-contaning wastewater by aerosol-mediated separation", Water Research, vol. 101, Elsevier Ltd., 2016, 333-340.

Horst, John, et al., "Water Treatment Technologies for PFAS: The Next Generation", Groundwater Monitoring & Remediation, National Ground Water Association, 2018.

Kang, Shufang, et al., "Effective improvement of defoaming efficiency using foam breaker with synthetic sponge cylinders in foam fractionation", Chemical Engineering and Processing: Process Intensification, Elsevier B.V., 2016, 26-32.

Lee, Yu-Chi, et al., "Recovery of perfluorooctane sulfonate (PFOS) and perfluorooctanoate (PFOA) from dilute water solution by foam flotation", Separation and Purification Technology, vol. 173, Elsevier B.V., 2017, 280-285.

McGuire, Meghan E., et al., "Evidence of Remediation-Induced Alteration of Subsurface Poly- and Perfluoroalkyl Substance Distribution at a Former Firefighter Training Area", Environmental Science & Technology, vol. 48, American Chemical Society, 2014, 6644-6652.

Meng, Pingping, et al., "Efficient removal of perfluorooctaine sulfonate from aqueous film-forming foam solution by aeration-foam collection", Chemosphere, vol. 203, Elsevier Ltd., 2018, 263-270.

Merino, Nancy, et al., "Degradation and Removal Methods for Perfluoroalkyl and Polyfluoroalkyl Substances in Water", Environmental Engineering Science, vol. 33, No. 9, Mary Ann Liebert, Inc., 2016, 615-649.

Ross, Ian, et al., "A review of emerging technologies for remediation of PFASs", Remediation, vol. 28, Wiley Periodicals, Inc., 2018, 101-126.

Xiao, Xin, et al., "Sorption of Poly- and Perfluoroalkyl Substances (PFASs) Relevant to Aqueous Film-Forming Foam (AFFF)-Impacted Groundwater by Biochars and Activated Carbon", Environmental Science & Technology, vol. 51, American Chemical Society, 2017, 6342-6351.

Zhang, Weilan, et al., "Removal of eight perfluoroalkyl acids from aqueous solutions by aeration and duckweed", Science of the Total Environment, vol. 724, Elsevier, B.V., 2020, 138537-1-9.

* cited by examiner

*FIG. 6*

SEPARATION COLUMNS FOR PER- AND POLYFLUOROALKYL SUBSTANCES (PFAS) REMEDIATION

CROSS-REFERENCE TO RELATED APPLICATIONS

This application claims priority to and the benefit of the filing of U.S. Provisional Patent Application No. 62/843,914, filed May 6, 2019, entitled Separation Columns for Per- and Polyfluoroalkyl Substances (PFASs) Remediation, the specification, drawings, and claims of which are incorporated herein by reference.

BACKGROUND OF THE INVENTION

Field of The Invention (Technical Field)

The present invention is related to remediation of per- and polyfluoroalkyl substances (PFAS).

Background Art

Note that the following discussion may refer to a number of publications and references. Discussion of such publications herein is given for more complete background of the scientific principles and is not to be construed as an admission that such publications are prior art for patentability determination purposes.

PFAS are a group of manmade chemicals including a range of perfluoroalkyl acids (PFAA) with varying perfluoroalkyl chain lengths. Due to toxicity, bioaccumulation and environmental persistence, PFAS have been recognized as contaminants of emerging concern (CECs) and listed in a top priority list of unregulated contaminants by the US Environmental Protection Agency (EPA). Because of unique properties such as low surface tension, acid resistance, water and oil repellence, and thermal and chemical stability, PFAS are widely used in many products such as nonstick cooking utensils, cleaning products, food packaging, in furniture and carpet as a surface coating, and as a main ingredient in producing aqueous film forming foams (AFFF) to extinguish fires. The release of PFAS to the environment has caused a growing concern about human exposure to them because of their stability in the environment. These compounds are classified as P.B.T.: Persistent in the environment, Bioaccumulation in organisms, and Toxic at relatively low levels (parts per trillion). PFAS have several health effects and their elimination from the body takes several years. Exposure to PFAS can cause serious diseases such as diabetes, cancer and disorders in reproductive health, the immune system, and the thyroid. PFAS-contaminated ground and surface water has affected hundreds of millions of people around the world.

Since the awareness about the environmental impact of PFAS is rather recent, conventional technologies have been utilized for PFAS removal from water, such as granular activated carbon (GAC), ion exchange, reverse osmosis (RO) and/or nanofiltration (NF). These conventional methods are limited in many ways, such as having a low effectiveness for removal of short chain or neutral PFAS, having a high-energy demand, generating a huge amount of secondary wastes (e.g., 20%-40% of influent in case of RO) that need to be disposed of or discharged, and landfill issues of used resins or carbons. Destructive methods such as sonolysis and electrochemical treatment have also been studied to remove PFAS, but these energy intensive methods have limitation for large-scale applications, Other adsorption methods using the new generation of adsorbents such as molecularly imprinted polymers and amine-containing materials not only are expensive to produce, but also need regeneration processes that result in high costs and production of secondary waste, reducing their scale-up potential. However, these methods are still more efficient than chemical oxidation methods using dichromate, calcium hypochlorite, sodium persulfate, potassium permanganate, and UV light.

Although foam fractionation with ozone (as described in, for example, US Pat. Appl. No. 2014/0190896) has been used for PFAS removal from water, there are still some challenges using this method. The foam fractionation method is generally a method of passing foam through a fluid rather than bubbling a gas through the fluid. Therefore, a high volume of ozone gas is injected into the ozofractionation column or well from the bottom (single-stage gas injection) to produce a large foam fractionate, resulting in high operating costs. Furthermore, the waste stream of the ozofractionation column as a portion of the foam fractionate contains high amounts of carried water, which must be recycled into the column, affecting the separation efficiency and time. An in-situ foam fractionation method using compressed air to remove PFAS has shown ineffectiveness in PFAS removal outside of the well annulus. There is also a concern of groundwater re-contamination using this method through formation of a PFAS-enriched foam fractionate outside the well caused by air escaping the well.

The air sparging method as a routine remedial activity on groundwater well facilities is used to remove the volatile organic carbon from the contaminated-saturated zone through the large volume injection of pressurized air into groundwater. Vapor phase contaminants are carried by air bubbles into the soil where a soil vapor extraction (SVE) system remove vapors. Air sparging is usually used along with a biological oxidation process. Formation of large bubbles is necessary in the in-situ air sparging method in order to meet bubble flow and required convection currents. These large bubbles, typically 4 mm or larger, are not effective for PFAS removal due to very short contact time with contaminated water and the method of their injection. Conventional bio-sparging activity on groundwater wells with PFAS contamination has resulted only in the transformation of polyfluorinated precursors into perfluoroalkyl acids due to the oxidation process, rather than removing them. For example, in U.S. Patent Publication No. 2019/0300387, a high gas volume (up to 99% in the conducted tests) is injected into the groundwater well only in one stage, at the bottom of the well. Such single-stage injection of high volume gas results in large bubble formation in the well.

SUMMARY OF THE INVENTION (DISCLOSURE OF THE INVENTION)

An embodiment of the present invention is a system for removing contaminants from a waste stream, the system comprising a separation column comprising a plurality of porous trays disposed above one another within the separation column; a plurality of spargers, each sparger disposed above one of the porous trays but below a weir height of each the porous trays; a waste stream inlet above the topmost porous tray for receiving the waste stream; a treated water outlet below the bottommost porous tray; a plurality of gates each configured to collect contaminant-enriched foam from the surface of liquid on each of the porous trays; and a foam stream outlet. The system preferably comprises a foam collector at a top of the separation column. The size of each gate opening is preferably between approximately 10% and approximately 30% of the diameter of each porous tray. The vertical distance between adjacent trays is preferably between approximately two times and four times a diameter of each porous tray. The weir height for each porous tray is preferably less than approximately 50% of a vertical distance between adjacent porous trays. At least one of the porous trays preferably comprises circular openings. The diameter of each circular opening is preferably between approximately 0.125 inch and approximately 1 inch and a hole pitch is between approximately 0.25 inches and approximately 2 inches. The total area of openings in each porous tray is preferably between approximately 10% and approximately 50% of the area of the porous tray. The system preferably comprises a recycle line connected between the treated water outlet and the waste stream inlet.

Each sparger preferably comprises a plurality of orifices. The diameter or other size of at least some of the orifices is preferably between approximately 0.1 μm and approximately 500 μm. Each sparger preferably comprises one or more perforated tubes having an orifice pitch preferably between approximately 0.5 mm and approximately 50 mm. The orifice sizes of all the spargers are preferably the same, but the orifice sizes of at least one of the spargers are optionally different than orifice sizes of another sparger. The orifice sizes of the spargers are preferably chosen to maximize efficiency of removal of per- and polyfluoroalkyl substances (PFAS) from the waste stream. The sizes of the orifices in each sparger are preferably selected so that bubbles produced by each sparger are the same size. The sizes of orifices in each sparger are preferably selected so that bubbles produced by at least one of the spargers are a different size than bubbles produced by another sparger. Bubbles produced by the spargers are preferably less than one millimeter in size.

The system preferably comprises a gas supply, which preferably supplies a gas selected from the group consisting of air, nitrogen, oxygen, ozone, and mixtures thereof. The system preferably comprises a device for controlling the flow rate of gas from the gas supply. The device is preferably selected from the group consisting of flow meter, valve, flow regulator, pressure regulator, and flow control valve. The device is preferably configured to provide a gas flow rate between approximately 10% and approximately 80% of an inlet waste stream rate. The device is preferably configured to operate the system at less than 30% gas hold-up, and more preferably less than 10% gas hold-up. The system preferably comprises a supply of foaming agent for mixing with the waste stream. The foaming agent preferably comprises a surfactant or a blowing agent, and the surfactant preferably comprises Glucopon 225 DK. The system is preferably useful for removing short-chain PFAS, long-chain PFAS, and mixtures thereof from the waste stream.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Embodiments of the present invention are methods and apparatuses to exploit the natural tendency of PFAS to produce foams to develop an effective treatment process for PFAS removal from water by utilizing a separation column comprising perforated trays each equipped with a sparger and a new approach to inject the air into the column to enhance the separation efficiency and lower the operating costs and energy for removing and collecting the PFAS in water and wastewater treatment plants. As used throughout the specification and claims, the term "sparger" means a porous device with openings for injecting air or another gas into a liquid, including a distributor, distributer, sparger, gas distributor, gas distributer, gas sparger, air distributor, air distributer, air sparger, and the like. In contrast to the prior art, embodiments of the present invention comprise a column with multi-stage air injection preferably generating small sub-mm sized bubbles. The column is preferably designed to maximize air-water contact time rather than gas hold-up, resulting in higher separation efficiency, reduced separation time, and lower operating costs.

Figure 1:
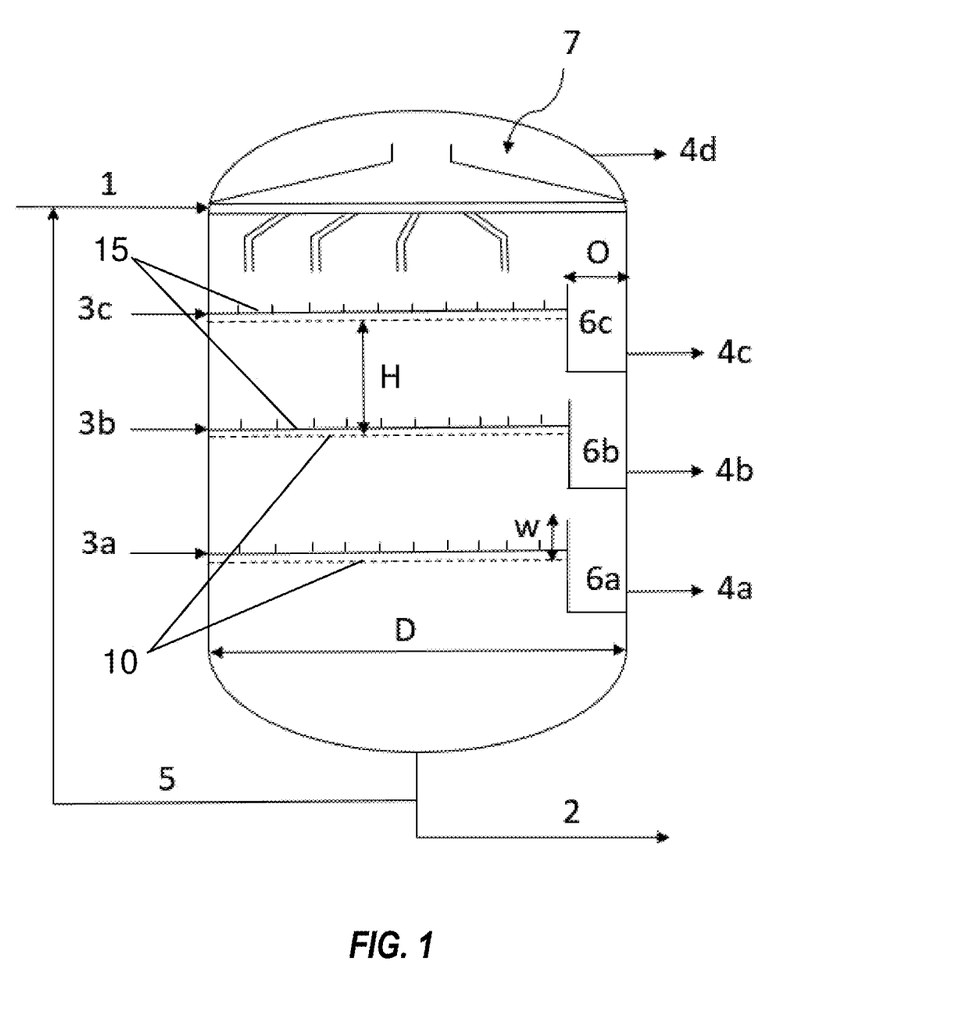
FIG. 1 is a schematic of a tray column comprising multiple stacked separation trays of the present invention.
Figure 2:
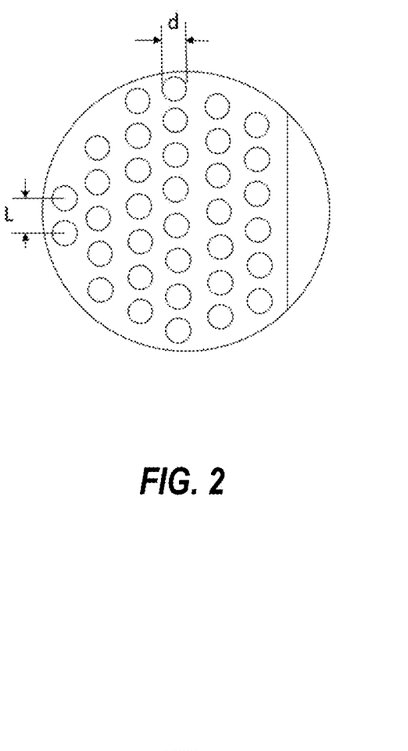
FIG. 2 is a schematic of a perforated separation tray of the present invention.

Embodiments of the present invention use a specialized, customizable tray column, shown in FIG. 1, to remove PFAS from the feed water. Inlet stream 1 of water containing PFAS enters the tray column and flows through a series of perforated trays 10 in which PFAS is progressively removed by sparging or injecting air in the water retained on the surface of the trays. The spacing between each perforated tray 10 is preferably configured so that water dripping from tray to tray forms foam on the top layer of water in each tray 10, thus increasing the removal efficiency from tray to tray. A detail of an embodiment of a porous tray of the present invention comprising a plurality of openings is shown in FIG. 2. The spacing H between the trays is preferably approximately between two and four times the tray diameter D. The weir height w for each tray is preferably less than approximately 20%-50% of the tray spacing. The tray openings, which are preferably circular but may have any shape, preferably comprise approximately 10%-50% of the tray area. The diameter d of each opening is preferably between approximately ⅛" and 1 inch. The hole pitch L is preferably approximately between 0.25 inches and 2 inches. The openings may be disposed in a regular array or randomly on each tray. The water with the PFAS removed exits as treated water stream 2 from the bottom of the column. The size of openings in the trays and the inlet flow rate controls the water level contained above the trays.

Figure 3:
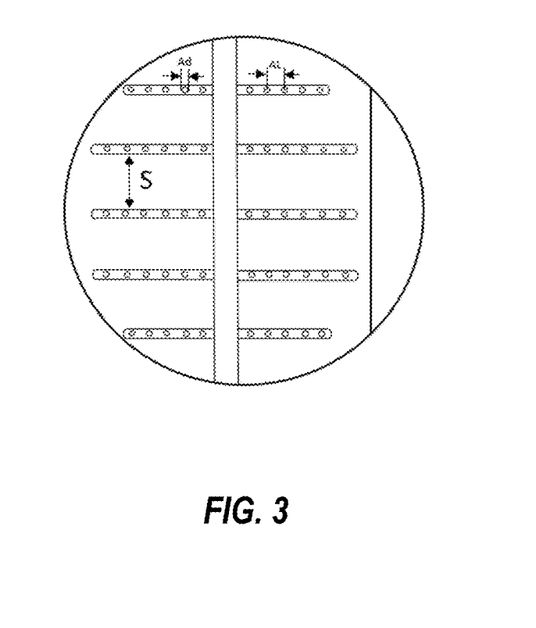
FIG. 3 is a typical schematic of an air sparger placed on top of each tray to increase the PFAS removal efficiency.

A gas sparger 15 produces air bubbles in the liquid on each tray 10, preferably optimizing bubble size, surface area, and contact time with water at different air flow rates. An air blower, injector, or pump is preferably used to pump the gas into the column and through inlets 3a, 3b, 3c in each gas sparger 15, creating air bubbles in the liquid in each tray 10. Although air is typically used, gases other than air, including but not limited to nitrogen, oxygen, and ozone, or combinations thereof may be injected into the column. The sparger orifice size, air pressure and flow rate all control the bubble size. The size of the produced bubble size is preferably the same order of magnitude as the orifice size, thus the orifice size is preferably a controlling factor for optimum removal. The air flow rate entering the tray column is preferably between approximately 10% and 80% of the inlet water flow rate. The sparger may comprise perforated tubes, a nozzle network, or any other design. The typical sparger shown in FIG. 3 comprises a main header connected to a plurality of perforated tubes. The spacing of adjacent tubes S is preferably between approximately ¼" and 4 inches. The orifice pitch AL along each perforated tube is preferably between approximately 0.5 mm and 50 mm. The orifice diameter Ad is preferably between approximately 0.1 μm and 500 μm. PFAS are adsorbed to the air-water interface of bubbles and rise to the top of the water level on the tray surface, producing PFAS-enriched or concentrated foam. Depending on the PFAS contamination level, foaming agents including but not limited to Glucopon 225 DK and other surface-active materials may be used to form a sufficient amount of enriched foam. The enriched foam can be collected from the surface of each tray through level-controlled gates 6a, 6b, 6c, and form enriched foam streams 4a, 4b, 4c, 4d that can be collected from the water surface. The level-controlled gate opening is preferably approximately between 10% and 30% of the tray diameter. Optional foam collector 7 on the top of the column preferably enhances process safety.

Injection of gas at multiple stages of the separator column preferably enables the bubble size to be the same along the column height, resulting in higher bubble surface area and residence time for enhanced PFAS removal, compared with enlarged bubbles formed at elevated heights in conventional bubble columns. Multi-stage air injection also decreases the power consumption of the required air blower by at least one order of magnitude, due to less pressure head exerted by the water level on each tray when compared to the total water level in conventional foam fractionation and bubble columns with single-stage gas injection.

The amphiphilic (both hydrophobic and hydrophilic) nature of PFAS drives them to the surface of the resultant air bubbles. The air bubbles adsorb the PFAS that move toward the surface of water due to buoyancy forces. Since PFAS in the water are thermodynamically adsorbed at the surface of air bubbles, their migration and accumulation at the surface of the water due to frothing provides an efficient method for removing PFAS from the bulk water on each tray. The residence time of water on the trays is preferably controlled for maximum PFAS removal due to the enhanced interaction between the bubbles and the PFAS molecules. The air-water contact time can also be controlled through bubble size. The smaller size of bubbles injected into the whole column through multi-stage air injection increases the total surface area and residence time of the bubbles, thus increasing PFAS adsorption on the surfaces of the bubbles.

Figure 4:
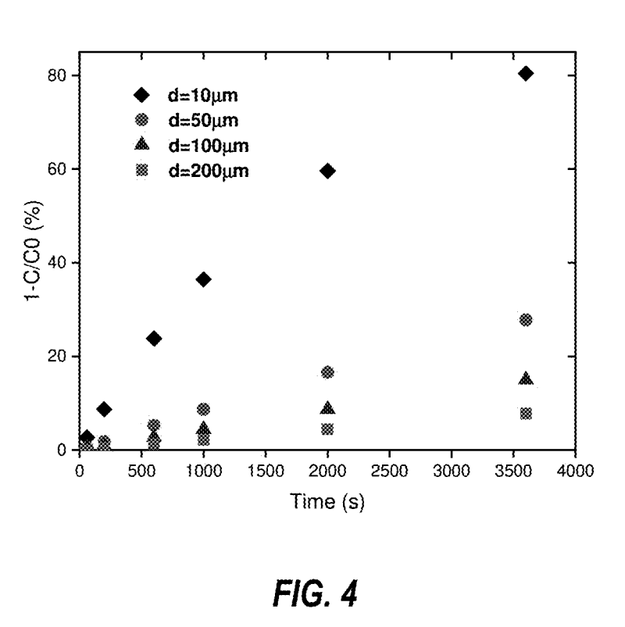
FIG. 4 shows the effect of air bubble size on PFAS separation efficiency at a constant air flow rate.

As shown in FIG. 4, smaller air bubbles are greatly beneficial to the separation process due to their higher surface area, but they need a longer time to rise to the surface of water, which may surpass the residence time of the water in the column. Therefore, the bubble size is preferably optimized in this design, determined based on the contaminant level of inlet stream 1 to increase the air-water interface area and maximize the removal efficiency of total PFAS. Since 100% removal may not be required based on applicable regulations, there is preferably an optimal bubble size for achieving the allowable contamination level, related to the level of contaminants in the water resource.

Based on the contaminant level in the inlet stream, a series of tray columns may be used to decrease the contaminant level to zero (or at least below the recommended drinking water health standard) in treated water stream 2. Thus, by adding more trays per column or more columns, the present invention can remove PFAS from waste streams with a wide range of PFAS concentrations, including but not limited to aqueous waste streams. In conventional bubble columns, freshly formed bubbles at the bottom of the column become larger due to the reduced pressure as they rise along the column height. The large bubbles at elevated heights have lower surface area and higher rise velocity (lower residence time) compared to the initially formed smaller bubbles, which results in lower PFAS adsorption on bubbles surfaces. In contrast, embodiments of the column of the present invention avoid such large bubble formation at elevated heights by injecting the air at each tray.

In a counter-current flow of water and air phase, the foam generated at the lower stages contains less PFAS as compared to the upper stages at the same amount of air flow rate and the same bubble size. In contrast, the multi-stage design of the column of the present invention enables the use of air spargers having different pore sizes at different stages of the column to maximize PFAS removal efficiency for a particular application. For example, air spargers at lower stages may have different pore sizes than those at upper stages so that they achieve the same removal efficiency as the upper stages. In this case there is not significant difference in waste streams of different stages.

Figure 5:
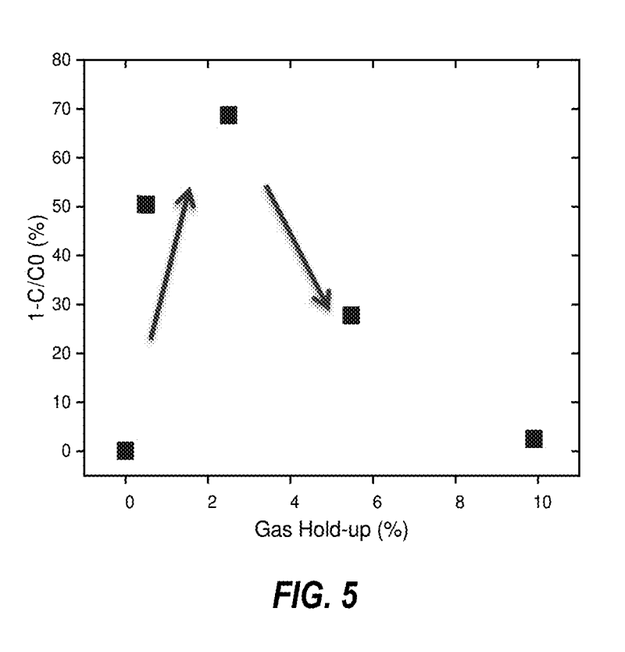
FIG. 5 shows the effect of gas hold-up on PFAS separation efficiency at a constant bubble size.

Gas hold-up is a dimensionless parameter defined as the ratio of gas phase volume to total volume of gas and liquid in the system. According to FIG. 5, which plots the PFAS separation capacity achieved at different gas hold-up values using a typical air diffuser of the present invention, there is an optimum gas hold-up in order to achieve maximum separation efficiency. The separation capacity or efficiency (%) is defined according to the following equation:

$$\text{Separation efficiency (\%)} = \frac{C_0 - C}{C_0} \times 100\%$$

where $C_0$ and $C$ are the PFAS concentration in inlet stream 1 and treated water stream 2, respectively. To calculate the PFAS concentration, the following equations are used:

$$\frac{C}{C_0} = e^{-\gamma t}$$

where t is time and γ is depletion rate constant which is specific for each compound, gas flowrate, and bubble size distribution and is achieved using the following equation:

$$\gamma = Nu\frac{\pi d^2}{4}\beta(f)\eta k_a$$

where N, u, d, β(f), η and $k_a$ are number of bubbles per unit volume of water, mean bubble rise velocity, mean bubble diameter, a factor considering the effect of other bubbles, contact efficiency and adsorption coefficient, respectively.

Comparing the waste generated in the present column with conventional foam fractionation columns, the liquid hold-up (the amount of liquid carried by the bubbles) in the concentrated (outlet) foam is lower in the columns of the present invention. The reason is that the foam fractionation columns are designed to inject high volume of gas phase to reach a gas hold-up, as much as 99%, in the system to increase the removal efficiency. Thus high gas hold-up is a characteristic of conventional foam fractionation/bubble columns. Most of the conventional column volume is filled with foam, rather than a water level containing gas bubbles as in the columns of the present invention. This high volume of produced foam contains higher amounts of water carried into the waste stream which optimally should be recycled to the column. The air volume in the column of the present invention is preferably optimized to achieve the maximum separation efficiency, which, as shown in FIG. 5, occurs at less than 10% gas hold-up for a typical air diffuser, far less than 99% gas hold-up in existing devices. The total amount of generated foam is lower in columns of the present invention due to the drastically lower gas hold-up. The present invention maximizes PFAS removal by increasing the air-water contact time rather than high gas volume injected to the column (i.e. maximum gas hold-up). The high gas injection into a conventional column not only increases the operating costs, it also increases the removal time to reach a certain PFAS concentration in the treated water due to the more frequent recycling process. Thus the lower gas hold-up of the present invention, together with the optimum size of bubbles formed on each tray surface, results in higher separation efficiency, reduced separation times, and lower operating costs compared to conventional methods. Furthermore, the amount of waste generated in the column of the present invention (0.5%-5% of influent) is far less than the amount of waste generated in RO technology (20%-40% of influent).

The PFAS-concentrated foam stream is collected from the surface of each tray and preferably undergoes a heating, vacuum, and/or low-pressure evaporation process to break the bubbles. The recovered PFAS can be transferred to industries utilizing PFAS as their raw material, or they can be oxidized to form chemicals of less environmental impact and concerns such as free fluoride for disposal (maximum contaminant level of 1.5 mg/L in drinking water set by World Health Organization for fluoride). The cost and energy of oxidation are much lower for the concentrated PFAS stream obtained from frothing than for contaminated water with parts per trillion (ppt) levels of PFAS, since it is typically from 0.5 percent to 5 percent of the inlet contaminated water volume. The present invention can thus be used to recycle PFAS, decreasing the environmental impact of PFAS synthesis. The process is inexpensive and does not require additional treatment of the water. The tray column is preferably also equipped with recycle line 5 to return the treated water back to the column (or alternatively to another column) for improving the efficiency of the system. The identification and quantification of different PFAS compounds in the treated water and concentrated stream are preferably analyzed by liquid chromatography tandem mass spectrometry.

Figure 6:
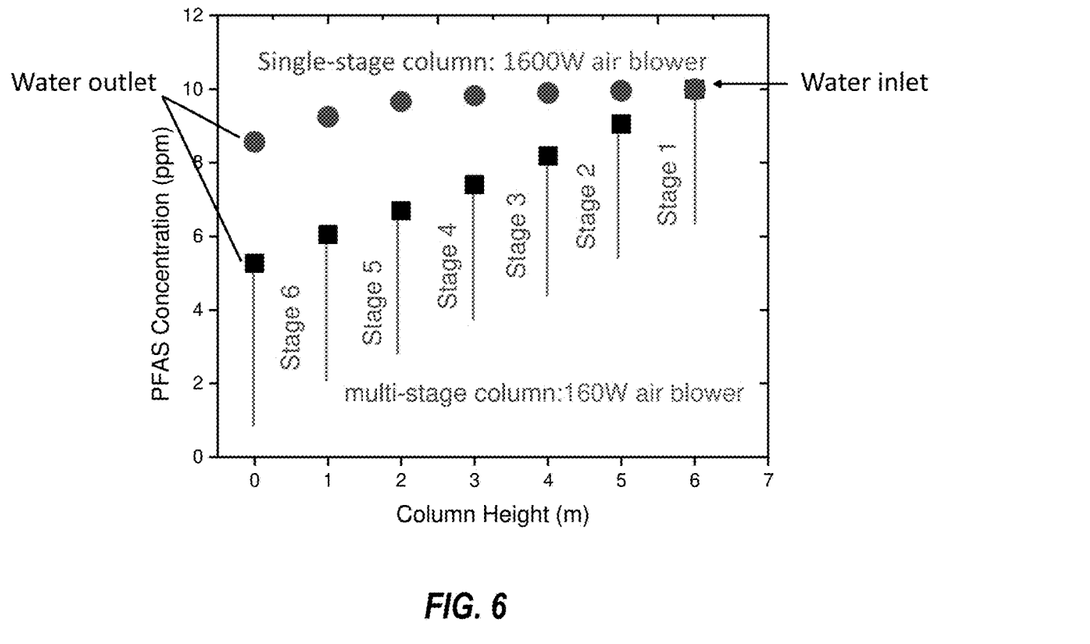
FIG. 6 compares the PFAS concentration as a function of column height and power consumption of multi-stage (squares) and single-stage (circles) separation columns at 5% gas hold-up.

FIG. 6 compares the dependence of the PFAS concentration on column height, and power consumption, of the multi-stage separation process of the present invention (squares), which comprises air injection at each stage, with a conventional column having gas injection at only one stage (circles), at the same gas hold-up (5%). Increasing gas hold-up may increase the separation efficiency in specific conditions; however, it leads to higher operating costs and longer separation time due to the high amount of water carried by the foam that needs to be recycled. Multiple-stage air injection also significantly reduces the power consumption of the air blower, up to one order of magnitude or more, since the water level in conventional columns is divided to several stages of lower height. Thus the lower water pressure head on each tray column means less pressure head is exerted by the water height in the air direction, compared to the pressure head exerted by the total column height in conventional columns. Furthermore, due to increased air-water contact time, less amount of air is required in columns of the present invention to reach a certain separation efficiency compared to foam fractionation columns or air sparging methods.

The present invention provides an effective separation method with low energy demand, low cost, high PFAS removal efficiency, no required chemicals, and very low additional waste production. The tray columns of the present invention create and collect foam for PFAS removal, are customizable, and can be scaled up. Recovered PFAS can be recycled through a simple low-pressure/thermal evaporation process to reduce their environmental impact. Example applications are water and wastewater treatment plants, ground water treatment, desalination plants, military facilities and companies which generate PFAS-containing waste in their production lines, such as food packaging and water repellent companies. The system of the present invention can be used as a pretreatment unit with other technologies such as reverse osmosis (RO) in desalination plants to reduce membrane fouling, PFAS-enriched waste amounts, operating costs, and system maintenance.

In summary, the multi-stage column of the present invention comprising air injection on each tray has several advantages that achieve higher PFAS adsorption on the bubbles surfaces, which means higher PFAS removal and lower operating costs of the present technology when compared to conventional foam fractionation/bubble columns. These advantages include:

- Air injection on each tray increases the PFAS mass transfer rate on bubbles surface at each stage due to the higher turbulence on each tray.
- Air injection on each tray generates fresh bubbles on each tray, unlike the saturated bubbles at elevated heights of conventional columns that have only one-stage air injection.
- Air injection on each tray prevents large bubble formation at elevated heights of the column, which is an undesirable characteristic of conventional columns with only one-stage air injection at the bottom.
- Multi-stage columns with air injection at each stage provide more flexibility in column design in terms of column geometry. The less water pressure exerted in the air direction in the present columns enable the column height, i.e. the number of stages, to be increased, which is beneficial for PFAS adsorption on the bubbles surface due to the longer air-water contact time.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A system for removing contaminants from a waste stream, the system comprising a separation column comprising:
   a plurality of porous trays disposed above one another within said separation column;
   a plurality of spargers, one of said plurality of spargers disposed above each of said porous trays but below a weir height of each said porous tray;
   a waste stream inlet above the topmost porous tray for receiving the waste stream;
   a treated water outlet below the bottommost porous tray;
   a plurality of gates each configured to collect contaminant-enriched foam from the surface of liquid on each of said porous trays; and
   a foam stream outlet.

2. The system of claim 1 comprising a foam collector at a top of said separation column.

3. The system of claim 1 wherein a size of each gate opening is between approximately 10% and approximately 30% of a diameter of each porous tray.

4. The system of claim 1 wherein a vertical distance between adjacent trays is between approximately two times and four times a diameter of each porous tray.

5. The system of claim 1 wherein a weir height for each porous tray is less than approximately 50% of a vertical distance between adjacent porous trays.

6. The system of claim 1 wherein at least one of said porous trays comprises circular openings.

7. The system of claim 6 wherein a diameter of each said circular opening is between approximately 0.125 inch and approximately 1 inch and a hole pitch is between approximately 0.25 inches and approximately 2 inches.

8. The system of claim 1 wherein a total area of openings in each porous tray is between approximately 10% and approximately 50% of an area of said porous tray.

9. The system of claim 1 comprising a recycle line connected between said treated water outlet and said waste stream inlet.

10. The system of claim 1 wherein each said sparger comprises a plurality of orifices.

11. The system of claim 10 wherein a size of at least some of said orifices is between approximately 0.1 µm and approximately 500 µm.

12. The system of claim 10 wherein each said sparger comprises one or more perforated tubes and an orifice pitch along each said perforated tube is between approximately 0.5 mm and approximately 50 mm.

13. The system of claim 10 wherein orifice sizes of all said spargers are the same.

14. The system of claim 10 wherein orifice sizes of at least one said sparger are different than orifice sizes of another said sparger.

15. The system of claim 10 wherein sizes of orifices in each said sparger are selected so that bubbles produced by each said sparger are the same size.

16. The system of claim 10 wherein sizes of orifices in each said sparger are selected so that bubbles produced by at least one said sparger are a different size than bubbles produced by another said sparger.

17. The system of claim 1 wherein bubbles produced by each said sparger are less than one millimeter in size.

18. The system of claim 1 comprising a gas supply.

19. The system of claim 18 wherein said gas supply supplies a gas selected from the group consisting of air, nitrogen, oxygen, ozone, and mixtures thereof.

20. The system of claim 18 comprising a device for controlling a flow rate of gas from said gas supply.

21. The system of claim 20 wherein said device is selected from the group consisting of flow meter, valve, flow regulator, pressure regulator, and flow control valve.

22. The system of claim 20 wherein said device is configured to provide a gas flow rate between approximately 10% and approximately 80% of an inlet waste stream rate.

23. The system of claim 20 wherein said device is configured to operate the system at less than 30% gas hold-up.

24. The system of claim 23 wherein said device is configured to operate the system at less than 10% gas hold-up.

25. The system of claim 1 comprising a supply of foaming agent for mixing with the waste stream.

26. The system of claim 1 comprising a supply of a surfactant for mixing with the waste stream.

27. The system of claim 1 comprising a supply of Glucopon 225 DK for mixing with the waste stream.

28. The system of claim 1 comprising a supply of a blowing agent for mixing with the waste stream.

\* \* \* \* \*